April 28, 1959 C. BREEN 2,884,491

MESSAGE-WAITING SIGNAL FOR TELEPHONE SUBSCRIBERS

Filed Jan. 24, 1958

INVENTOR
C. BREEN
BY *A. F. Kane*

ATTORNEY 2,884,491
Patented Apr. 28, 1959

2,884,491

MESSAGE-WAITING SIGNAL FOR TELEPHONE SUBSCRIBERS

Charles Breen, Mineola, N.Y., assignor to Bell Telephone Laboratories, Incorporated, New York, N.Y., a corporation of New York Application January 24, 1958, Serial No. 711,090

3 Claims. (Cl. 179—84)

This invention relates to telephone substation signaling, and particularly to means for controlling the operation of a "message-waiting" signal at a telephone subscriber station.

Frequently, telephone calls to called stations cannot be completed at the time of their initiation because of the absence of the called party. To provide additional service on such calls, facilities have been proposed heretofore whereby the calling party may request the telephone operator to transmit a message to the called party when the latter again becomes available for telephone communication. Implementation of such service requires either frequent attempts by the operator to establish telephone contact with the called subscriber; the dispatch of a bell boy with a written message in hotels and the like; or the positive manifestation, at the called station, of a signal which the called subscriber, upon his return, will recognize as a message-waiting signal, and will heed by initiating a call to the central office or P.B.X which services his line, to receive the message being held there for him.

It is the object of this invention to provide an improved type of message-waiting facility at a telephone subscriber station.

This object is attained, in accordance with a feature of the invention, by the provision of a visual signal device at the subscriber station which is controlled from a remote point over the tip and ring conductors of the subscriber's line. Specifically, the visual signal device employed, in a preferred embodiment of the invention, is a gas-filled tube, such as a neon lamp, which is located at the subscriber station and is bridged across the tip and ring conductors of the subscriber's line for control by an attendant at the remote point.

In accordance with another feature of the invention, interference with the normal functioning of the subscriber line lamp signal at the remote point, incident to the application of message-waiting signal voltage to the subscriber line, is eliminated. The line lamp which is individual to the subscriber's line and appears at the remote point to indicate the initiation of a call at the subscriber station, normally is included in the line circuit in a manner such that when the telephone is removed from its support at the calling station, the lamp is energized over the line loop comprising the tip and ring conductors of the line. Unless otherwise guarded against, the application of message-waiting signal voltage to the line would cause the untimely operation of the corresponding line lamp. To preclude this eventuality, and in accordance with a specific feature of the invention, a unidirectional current conducting device, such as a diode of the dry rectifier type, is interposed between the line lamp and the point on the associated line conductor to which message-waiting signal voltage is applied.

A further feature of the invention contemplates a message-waiting signaling system in which the message-waiting signal at a subscriber station may be operated on direct current transmitted over the conductors of the subscriber's line under the control of an attendant at a remote point and is restored to normal condition under control of means at the remote point.

Still another feature of the invention permits the subscriber's line to be used for normal communication purposes when the message-waiting signal device at the subscriber station is in its operated condition.

These and other features of the invention will be better understood from the following detailed description when read with reference to the accompanying drawing in which.

Figure 1:
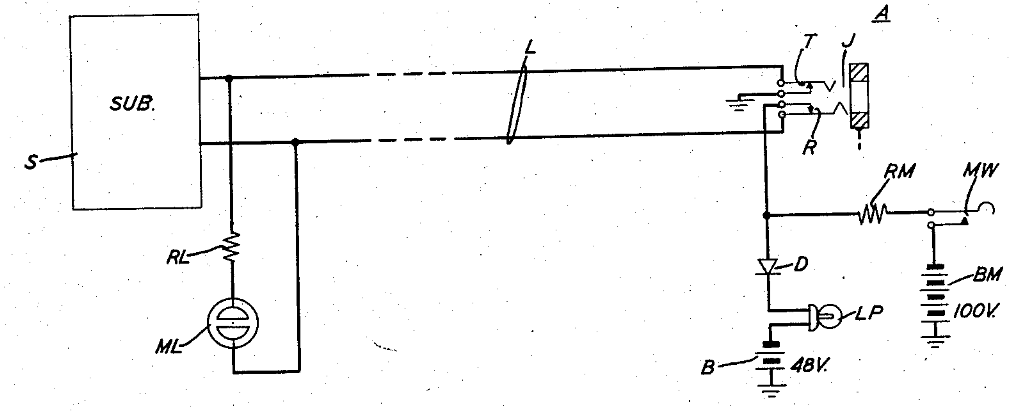
Fig. 1 is a circuit diagram, in simplified form, of a subscriber's telephone line embodying the features of the invention.

In Fig. 1 the telephone line L is shown terminating at one end in a jack J which may be located at an attendant's position at a central office or private branch exchange A, and at the other end at a substation S, which may be located at a private residence, or at a hotel, motel or similar dwelling. At the substation S the line L terminates in the usual telephone set, not shown. Also located at the substation and bridged across the tip and ring conductors of the line L in series with a resistor RL, is a gas-filled lamp or neon tube ML which, when energized, functions as a visual signal, hereinafter referred to as a message-waiting signal. The electrical characteristics of the neon tube are well known. Suffice it to say here that the tube is normally open circuited and will fire, or operate when subjected to a voltage of approximately 100 volts.

At the remote point A, which may be a location other than a switchboard attendant's position, the tip conductor of the line L is connected to ground by way of the normally closed contacts T of jack J, while the ring conductor is connected to the usual 48-volt battery by way of the contacts R of jack J, the diode D and the filament of line lamp LP, which may be multipled to other lamps. At the remote point A there is also provided a message-waiting key MW, the stationary contact of which is connected, by way of resistor RM, to a point in the line lamp circuit between the jack contacts R and the diode D. The other, or movable contact of key MW is connected to a 100-volt battery.

Figure 1A:
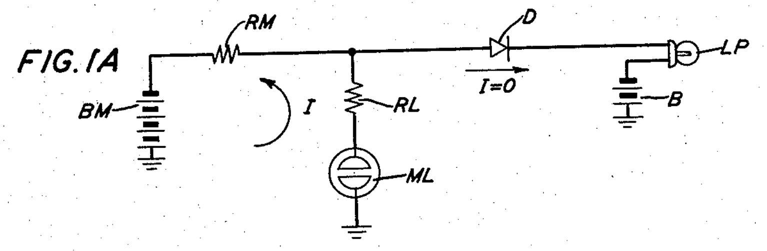
Fig. 1A is a circuit diagram illustrating circuit conditions which prevail when the attendant's message-waiting control equipment at the remote point is operated and the telephone set at the subscriber station is "on hook"
Figure 1B:
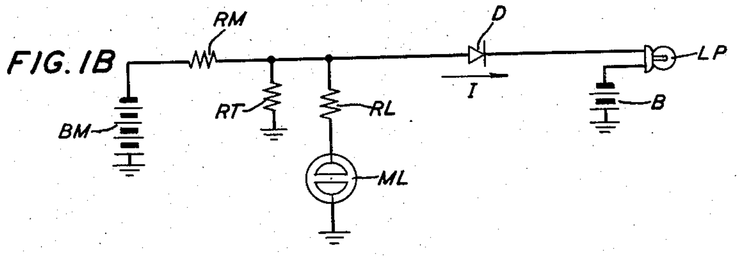
Figs. 1B and 1C are circuit diagrams illustrating circuit conditions which prevail when the attendant's message-waiting control equipment at the remote point is operated and the telephone set at the subscriber station is "off hook."
Figure 1C:
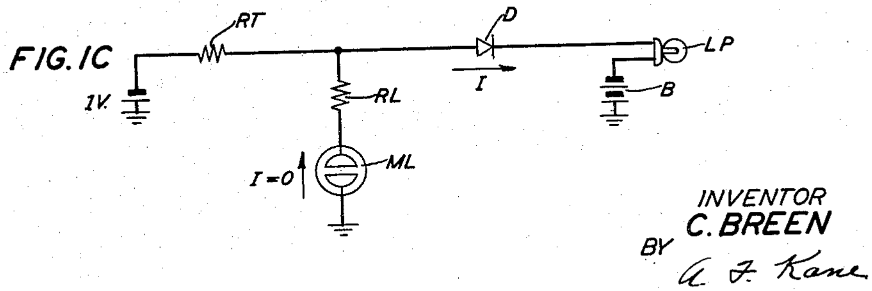

To initiate a call at substation S under normal conditions, that is when the lamp signal ML is open circuited, the telephone set is removed from its support to close the line loop in well known manner, whereupon the line lamp LP operates in a circuit which includes the grounded 48-volt source B at the remote point A, the filament of lamp LP, diode D, contacts R of jack J, ring conductor of line L, the closed switchhook contacts (not shown) at station S, the tip conductor of line L, the tip contacts T of jack J and ground. This condition is represented by Fig. 1C in which the resistance RT represents the telephone transmitter at station S. It will be observed that no current traverses the path including the message-waiting lamp ML and its associated resistor RL, whereas the current-conducting path includes the 48-volt source B, the line lamp LP, diode D, transmitter resistance RT and ground. The line lamp LP operates in this circuit as a call signal, and the attendant at A responds in the usual manner, that is, by inserting a cord plug (not shown) into the jack J associated with the lighted line lamp LP, and otherwise connecting the attendant's telephone set to the line L. It will be noted that under the conditions assumed, the bridge at substation S which includes lamp ML and resistor RL is open circuited, so that it offers no interference to speech transmission nor to the normal operation of line lamp LP. The diode D in the line lamp circuit is so poled with respect to the line lamp LP as to offer negligible resistance to the flow of current through the lamp LP.

In the event that a call should be directed to substation S during the absence of the subscriber, and the calling party should leave a message with the attendant at A for delivery to the called subscriber, the attendant would operate the message-waiting key MW associated with the called subscriber's line L in order to effect the operation of the message-waiting lamp ML at substation S. When key MW is operated, a circuit is completed which includes the 100-volt battery or potential source BM at the remote point A, the contacts of key MW, resistor RM, contacts R of jack J associated with line L, ring conductor of line L, lamp ML, resistor RL, tip conductor of line L, contacts T of jack J and ground. The voltage applied by the operation of key MW is sufficient to cause the lamp signal to break down and to become illuminated. The circuit condition which prevails when the attendant at A operates the key MW is illustrated by Fig. 1A. It will be noted under this condition that no current traverses the path which includes the line lamp LP. By noting the lighted lamp ML upon his return to substation S the subscriber is advised that the attendant at A has a message for him.

When the subscriber at substation S initiates a call to the remote point A in order to receive the message held there for him, as indicated by the lighted lamp ML, he proceeds in the usual call-originating manner by removing his telephone set from its support. It will be noted that the subscriber is not required to perform any special operation to extinguish the message-waiting lamp signal. Nor does the lighted lamp ML interfere in any way with the normal functioning of the line lamp LP. When the telephone set at substation A is lifted to effect the closure of the switchhook contacts, the transmitter resistance RT is introduced into the circuitry in parallel with the message-waiting lamp ML and its series-connected resistor RL, as shown in Fig. 1B. The constants of the circuit under this condition are such that the current traversing the path including lamp LP and the diode D is sufficient to light lamp LP as a call signal. The attendant noting the lighted line lamp LP and the operated condition of the corresponding message-waiting key MW is immediately apprised of the fact that the calling subscriber is one for whom she is holding a message. The attendant answers the call in the usual manner and restores the key MW to extinguish the message-waiting lamp ML at substation S.

In the illustrated embodiment of the invention the message-waiting signal is disclosed as a steadily operated visual signal. If a signal of greater attention-arresting character is desired, the lamp ML may be caused to operate intermittently in any well known manner.

What is claimed is:

1. In a telephone system, a telephone line, a station on said line, an attendant's position at which said line terminates, a signal bridge on said line at said station including a signal device requiring a relatively high voltage for its operation, a signal device at said attendant's position in said telephone line requiring a relatively low voltage for its operation, a source of high voltage at said attendant's position, means at said attendant's position for applying said high voltage source to said line to cause the signal device at said station to operate, and means for rendering the signal at said attendant's position immune to the high voltage from said high voltage source comprising a diode interposed between the signal device at said attendant's position and said telephone line.

2. In a telephone system, a telephone line interconnecting a substation and an attendant's position, a direct-current reponsive signal device at said substation included in said line, a direct-current responsive signal device at said attendant's position included in said line, means for applying direct current to said line to effect the operation of one of said signal devices, other means for applying direct current to said line to effect the operation of the other of said signal devices, and means comprising a unidirectional current conducting device included in series with one of said signal devices for rendering the said one of said signal devices responsive to the operation of only one of said direct-current applying means.

3. In combination, a telephone line having tip and ring conductors terminating at an attendant's position in a jack, a substation on said line, a line signal identifying said line at said attendant's position, means connecting said line signal to one of the conductors of said line and to a first source of current, a second source of current, means connecting said second source of current to the said one of the conductors of said line at a point intermediate said line conductor and said line signal, a diode serially-connected to said line lamp intermediate said lamp and the point of connection of said second source of current to the said one of said line conductors, and a signal device at said substation responsive to current from said second source.

References Cited in the file of this patent

UNITED STATES PATENTS

| | | |
|---|---|---|
| 2,278,504 | Wingardner | Apr. 7, 1942 |
| 2,428,007 | Boardman | Sept. 30, 1947 |